United States Patent
Thomas et al.

[19]

[11] Patent Number: 6,139,300
[45] Date of Patent: *Oct. 31, 2000

[54] WINDSHIELD REPAIR APPARATUS INCLUDING BRIDGE AND INJECTOR HOLDER

[75] Inventors: Jonathan P. Thomas, Maple Lake; Paul E. Syfko, Woodbury; Mark Charles Christian, S. Louis Park; Paul S. Petersen, Minnetonka, all of Minn.

[73] Assignee: TCG International Inc., Burnaby, Canada

[*] Notice: This patent issued on a continued prosecution application filed under 37 CFR 1.53(d), and is subject to the twenty year patent term provisions of 35 U.S.C. 154(a)(2).

[21] Appl. No.: 08/941,982

[22] Filed: Oct. 1, 1997

Related U.S. Application Data

[63] Continuation-in-part of application No. 08/725,068, Oct. 2, 1996, Pat. No. 5,952,012.

[51] Int. Cl.[7] .............................. B29C 73/02; B29C 73/24
[52] U.S. Cl. ........................... 425/12; 264/36.21; 425/13; 425/171
[58] Field of Search .................................. 425/11, 12, 13, 425/171; 264/36.21; 156/94

[56] References Cited

U.S. PATENT DOCUMENTS

| | | |
|---|---|---|
| 1,127,912 | 2/1915 | Motroni . |
| 1,604,949 | 11/1926 | Algeo . |
| 1,747,760 | 2/1930 | Duffy et al. . |
| 3,005,455 | 10/1961 | Poitras et al. . |
| 3,485,404 | 12/1969 | Newton . |
| 3,562,366 | 2/1971 | Sohl . |
| 3,765,975 | 10/1973 | Hollingsworth . |
| 3,910,304 | 10/1975 | Forsberg . |
| 3,988,400 | 10/1976 | Luhman, III . |
| 3,993,520 | 11/1976 | Werner et al. . |
| 4,032,272 | 6/1977 | Miller . |
| 4,047,863 | 9/1977 | McCluskey et al. . |
| 4,132,516 | 1/1979 | Story . |
| 4,200,478 | 4/1980 | Jacino et al. . |
| 4,231,494 | 11/1980 | Greenwood . |
| 4,249,869 | 2/1981 | Petersen . |
| 4,280,861 | 7/1981 | Schwartz . |
| 4,291,866 | 9/1981 | Petersen . |
| 4,385,015 | 5/1983 | Klettke . |

(List continued on next page.)

FOREIGN PATENT DOCUMENTS 1 0 296 671  6/1988  European Pat. Off. .

OTHER PUBLICATIONS

Liquid Resins International, Ltd. Catalog, 21 pages, dated Apr. 1, 1992.
The Glass Mechanix® brochure entitled "A Clear Path to Your Future Success," 8 pages, undated.
Wood's POWR–Grip Co., Inc. Bruchure entitled "Vacuum Cups For Materials Handling," 4 pages, dated Jan., 1995.
Cole–Parmer 97–98 brochure, cover page and p. 127.

*Primary Examiner*—Karen Aftergut
*Attorney, Agent, or Firm*—Merchant & Gould P.C.

[57] ABSTRACT

A windshield repair apparatus includes a bridge for holding an injector adjacent to a break area of a windshield. The bridge includes a suction cup for mounting the bridge to the windshield. The bridge includes a pivotally mounted arm which allows for pivotal movement of the injector away from the break area, and a registration system which allows for accurate replacement of the injector over the break area following pivotal movement back toward the break area. A ball plunger and detent mounting arrangement between the pivotally mounted arm and a remainder of the bridge allows for registration. The suction cup includes a vacuum pump for withdrawing air from beneath the suction cup. The injector includes a clip securing a stopper to a body of the injector. The stopper includes a peripheral lip seal at a first end of the stopper which is received by the body. The arm also is pivotally moveable toward and away from the windshield and is controlled by a threaded adjustment mechanism.

15 Claims, 21 Drawing Sheets

U.S. PATENT DOCUMENTS

| | | |
|---|---|---|
| 4,385,879 | 5/1983 | Wilkinson . |
| 4,419,305 | 12/1983 | Matles . |
| 4,569,808 | 2/1986 | Smali . |
| 4,597,727 | 7/1986 | Birkhauser, III . |
| 4,622,085 | 11/1986 | Yamada et al. . |
| 4,681,520 | 7/1987 | Birkhauser, III . |
| 4,744,841 | 5/1988 | Thomas . |
| 4,775,305 | 10/1988 | Alexander et al. . |
| 4,814,185 | 3/1989 | Jones . |
| 4,820,148 | 4/1989 | Anderson . |
| 4,921,411 | 5/1990 | Ottenheimer . |
| 4,954,300 | 9/1990 | Dotson . |
| 4,995,798 | 2/1991 | Ameter . |
| 5,069,836 | 12/1991 | Werner et al. . |
| 5,104,304 | 4/1992 | Dotson . |
| 5,122,042 | 6/1992 | Einiger . |
| 5,234,325 | 8/1993 | Hill . |
| 5,425,827 | 6/1995 | Campfield . |
| 5,429,692 | 7/1995 | Campfield . |
| 5,565,217 | 10/1996 | Beckert et al. . |
| B1 5,116,441 | 11/1993 | Campfield . |

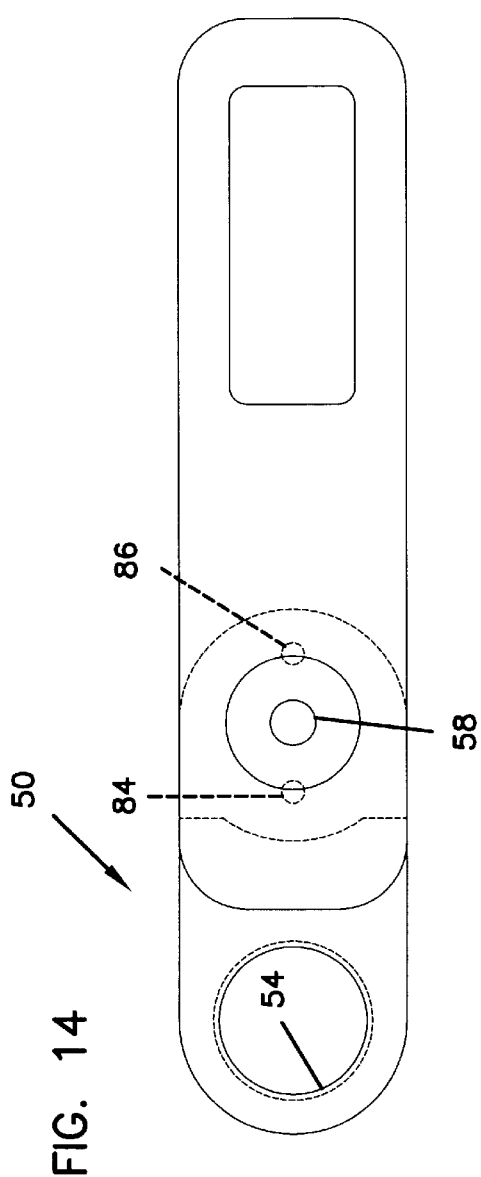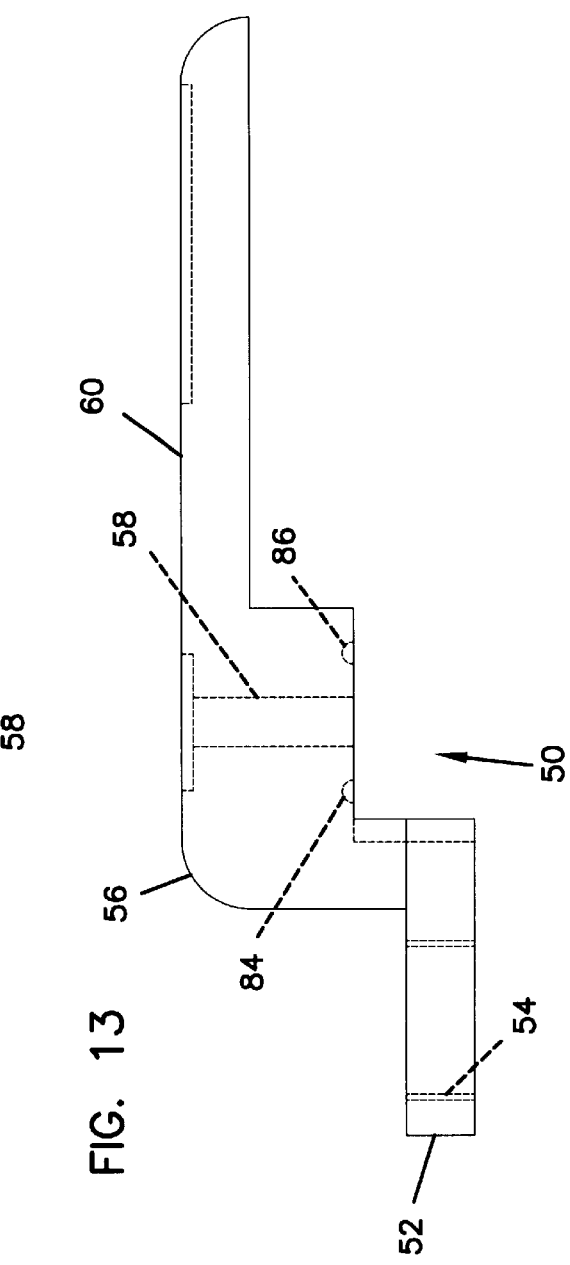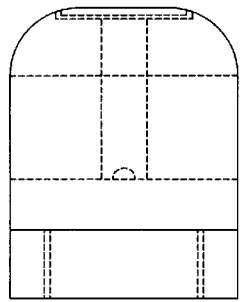

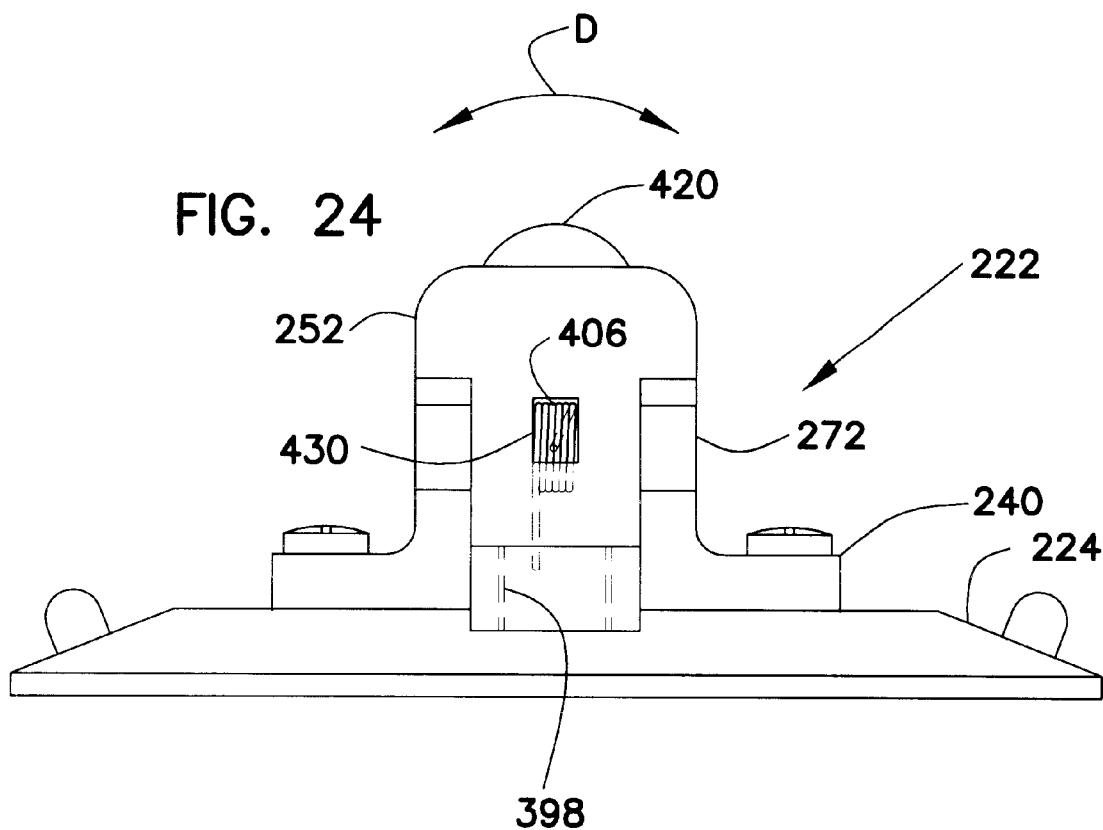
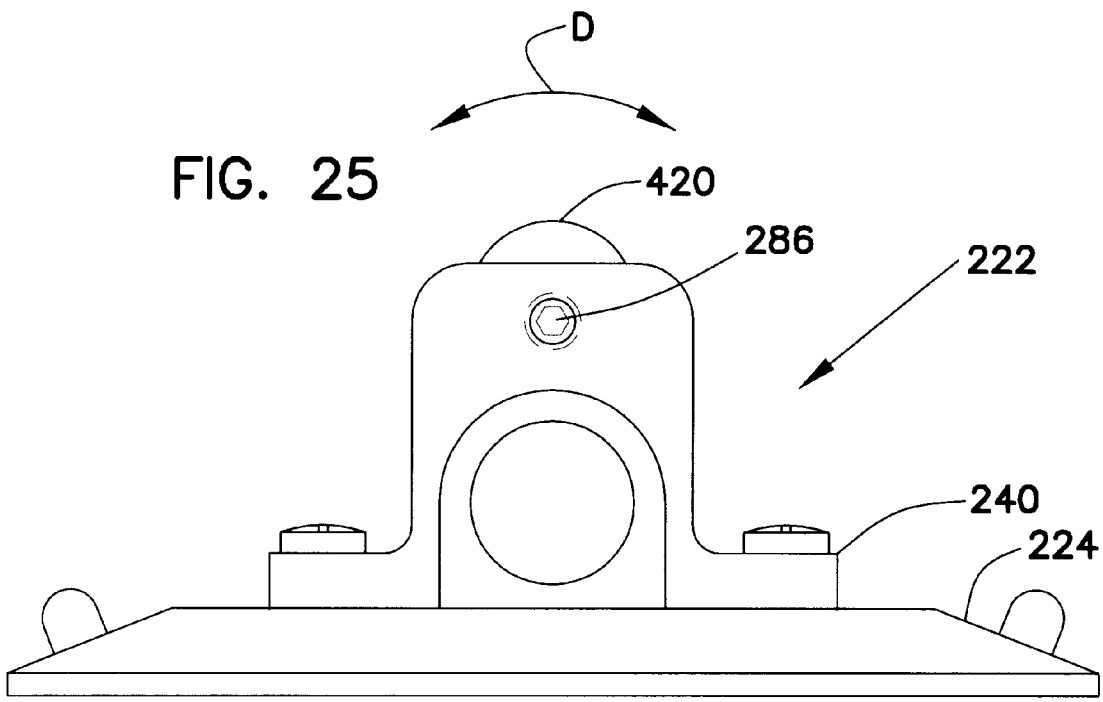

WINDSHIELD REPAIR APPARATUS INCLUDING BRIDGE AND INJECTOR HOLDER

RELATED APPLICATION(S)

This is a Continuation-in-Part application of application Ser. No. 08/725,068, filed Oct. 2, 1996, now U.S. Pat. No. 5,952,012 the disclosure of which is hereby incorporated by reference.

FIELD OF THE INVENTION

The present invention relates to apparatus and methods for repairing breaks in windshields.

BACKGROUND OF THE INVENTION

From time to time, a vehicle windshield will break, such as due to an object impacting against the windshield. A bull's-eye break may occur wherein the outer layer of safety glass incurs a break in the shape of an inverted cone. Other break shapes and cracks may be incurred in addition to or instead of the bull's-eye break. The inside layer of safety glass is typically unbroken. U.S. Pat. No. 4,291,866, issued Sep. 29, 1981, the disclosure of which is hereby incorporated by reference, illustrates an apparatus usable to repair a break in a vehicle windshield. The apparatus disclosed in the '866 reference includes a support apparatus for supporting an injector held against the windshield so that repair material can be applied to the break site. A repaired windshield is desirable over replacement of the windshield which can be quite costly, and time consuming.

Various concerns arise in connection with repair of windshields. One area of concern relates to the ease of use of the windshield repair apparatus. In particular, the ease in which the site is prepared, and the ease of application of the repair material are concerns. Accessibility to the site for the application of the repair material, and removal of impurities (e.g. air, moisture, dirt) from the break site and from the repair material are concerns. Visual access is also desired. In addition, the application of pressure above atmospheric pressure and the application of pressure below atmospheric pressure at the break site are desirable. Mechanical engagement of portions of the break site is also desirable. A goal of the repair process is to leave an optically invisible or virtually invisible repair site. Minimizing repair material waste is also a concern.

There is a need in the prior art for apparatus and methods which address the above concerns and other concerns.

SUMMARY OF THE INVENTION

The present invention relates to a windshield repair apparatus including a support apparatus or bridge for holding an injector adjacent to a break area of a windshield. The bridge includes a suction cup for mounting the bridge to the windshield. One preferred bridge includes a movably mounted arm which allows for movement of the injector away from the break area, and a registration system which allows for accurate replacement of the injector over the break area following movement back toward the break area. Preferably, the arm is rotatably mounted to the remainder of the bridge. Preferably, the arm is movable in a direction generally parallel to the windshield, such as for break area inspection purposes. One preferred embodiment includes a clamp releasably clamping the arm to a remainder of the bridge.

A preferred registration system includes a ball plunger and detent mounting arrangement between the pivotally mounted arm and a remainder of the bridge. One preferred location for the ball plunger and detent arrangement is between generally planar surfaces adjacent to the rotation axis of the arm. A preferred suction cup includes a vacuum pump for withdrawing air from beneath the suction cup.

A preferred injector of the present invention includes a body defining an inner passage for holding liquid resin. An outer surface of the body includes a shoulder. A first end of the body includes a resilient fitting. An opposite end of the body includes an open end. A stopper is received by the open end of the body. A clip engages the shoulder of the body of the injector to secure the stopper to the body. A preferred clip has two projecting arms, a resilient connecting section, and at least one inwardly projecting flange on opposite ends of the clip. The inwardly projecting flanges are positioned outside of the stopper and the shoulder of the body. Preferably, the clip includes a grasping tab or handle. One preferred injector includes a bayonet mounting arrangement for mounting the injector to the bridge, and a second shoulder to space the first shoulder from the bridge. Alternatively, the injector can mount directly to the bridge.

A preferred stopper includes a peripheral lip seal at a first end of the stopper which is received by the body. The stopper also preferably includes two passages, one central to the stopper and the other offset.

The present invention also relates to methods of using a windshield repair apparatus including the steps of mounting the windshield repair apparatus to a windshield with a suction cup, rotating an arm containing an injector relative to a remainder of the windshield repair apparatus, releasing the arm from a registration system, rotating the arm back to the original position, and reengaging the registration system. One preferred method further includes releasing a clamp holding the arm before rotating the arm from the original position. One preferred direction of movement of the arm is generally parallel to the windshield.

A further preferred embodiment of the apparatus of the present invention includes a registration system positioned on an end of the movably mounted arm. Preferably, this registration system includes a ball plunger and detent mounting arrangement acting in a direction transverse to the rotation axis of the arm.

A further preferred embodiment includes a pivotally mounted front end of the movably mounted arm to allow pivoting of the injector toward and away from the windshield, as desired. Preferably, the pivotally mounted front end is threadably adjustable. Such a pivotal mounting with adjustability is useful for adapting the apparatus for windshields having different amounts of curvature. One preferred embodiment includes a spring biased threaded adjustment mechanism including a knob rotatable on the arm to move the front end toward and away from the windshield, as desired.

A further preferred embodiment includes a self-locking screw threadably mounting the movable arm to the base. Thrust bearings are positioned between the base and the movable arm.

Further methods are provided in accordance with the invention including mounting the windshield repair apparatus to the windshield with the suction cup, and rotating a front end of the arm of the repair apparatus relative to the windshield, as desired, either toward or away from the windshield.

BRIEF DESCRIPTION OF THE DRAWINGS

FIG. 13 is a side view of the arm of the bridge of FIG. 1;

FIG. 14 is a top view of the arm of FIG. 13;

FIG. 15 is a left end view of the arm of FIG. 13;

FIG. 24 is a left side view of the bridge of FIG. 22.

FIG. 25 is a right side view of the bridge of FIG. 22.

DETAILED DESCRIPTION OF THE PREFERRED EMBODIMENTS

Figure 1:
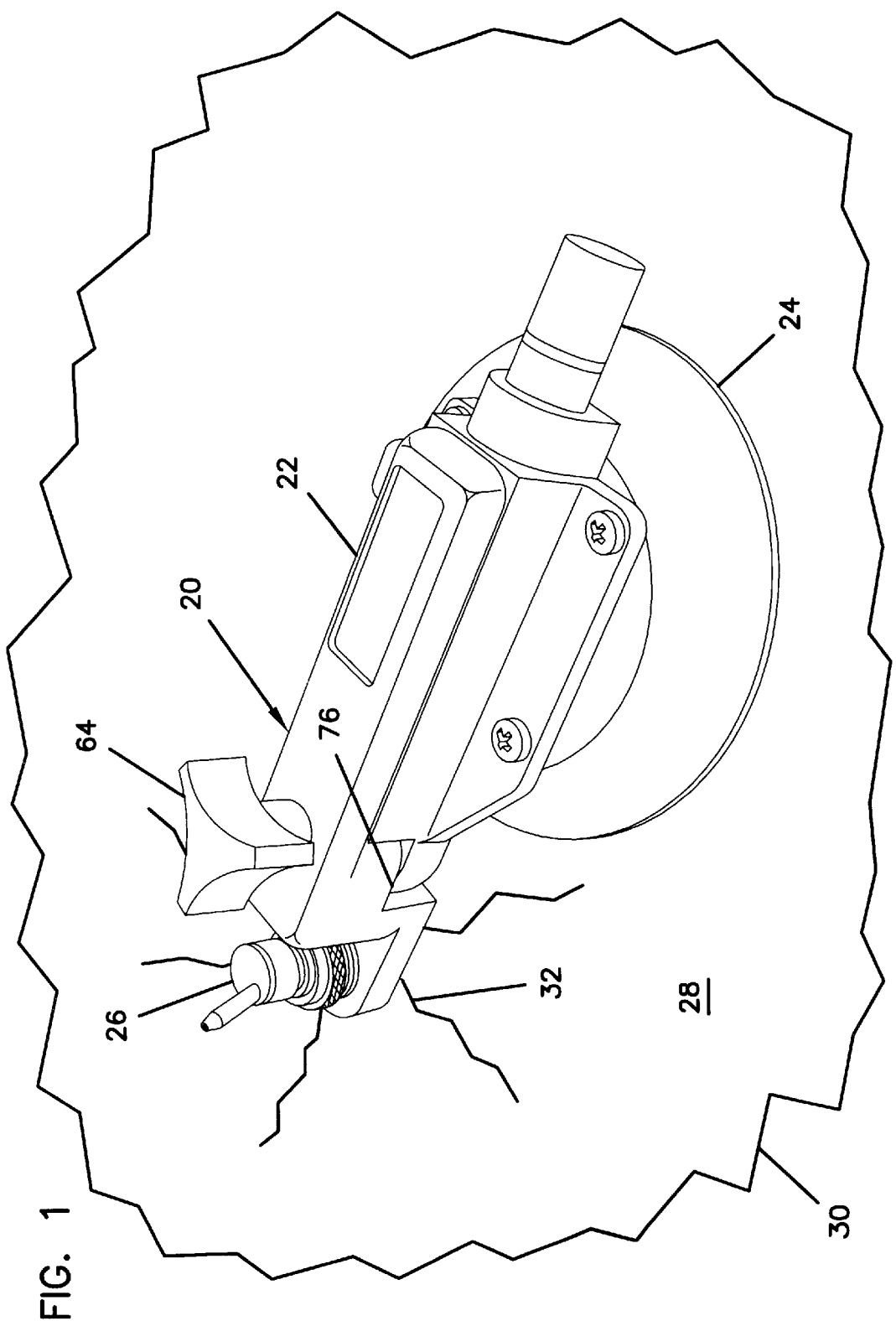
FIG. 1 is a perspective view of a first embodiment of a windshield repair apparatus in accordance with the invention.
Figure 2:
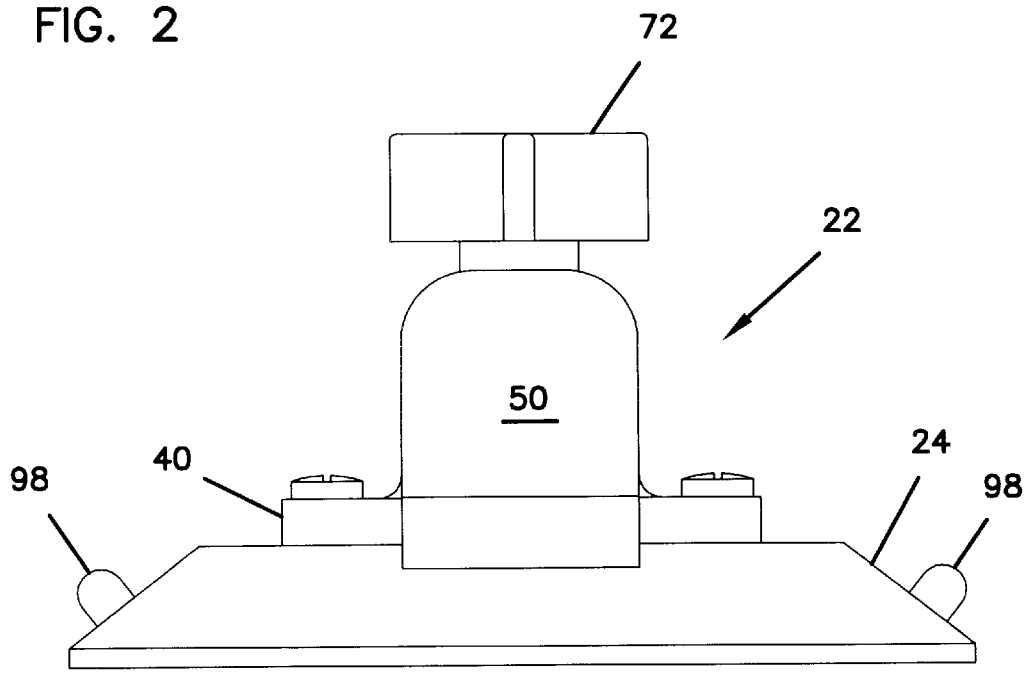
FIG. 2 is a left end view of the bridge of FIG. 1.
Figure 3:
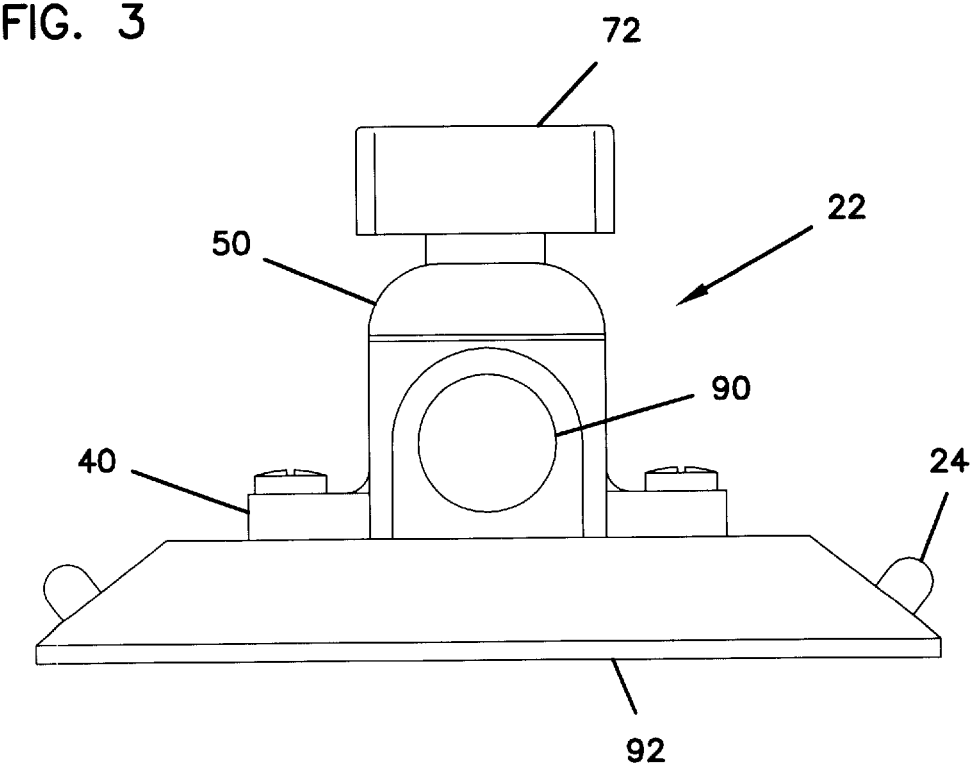
FIG. 3 is a right end view of the bridge of FIG. 1.
Figure 4:
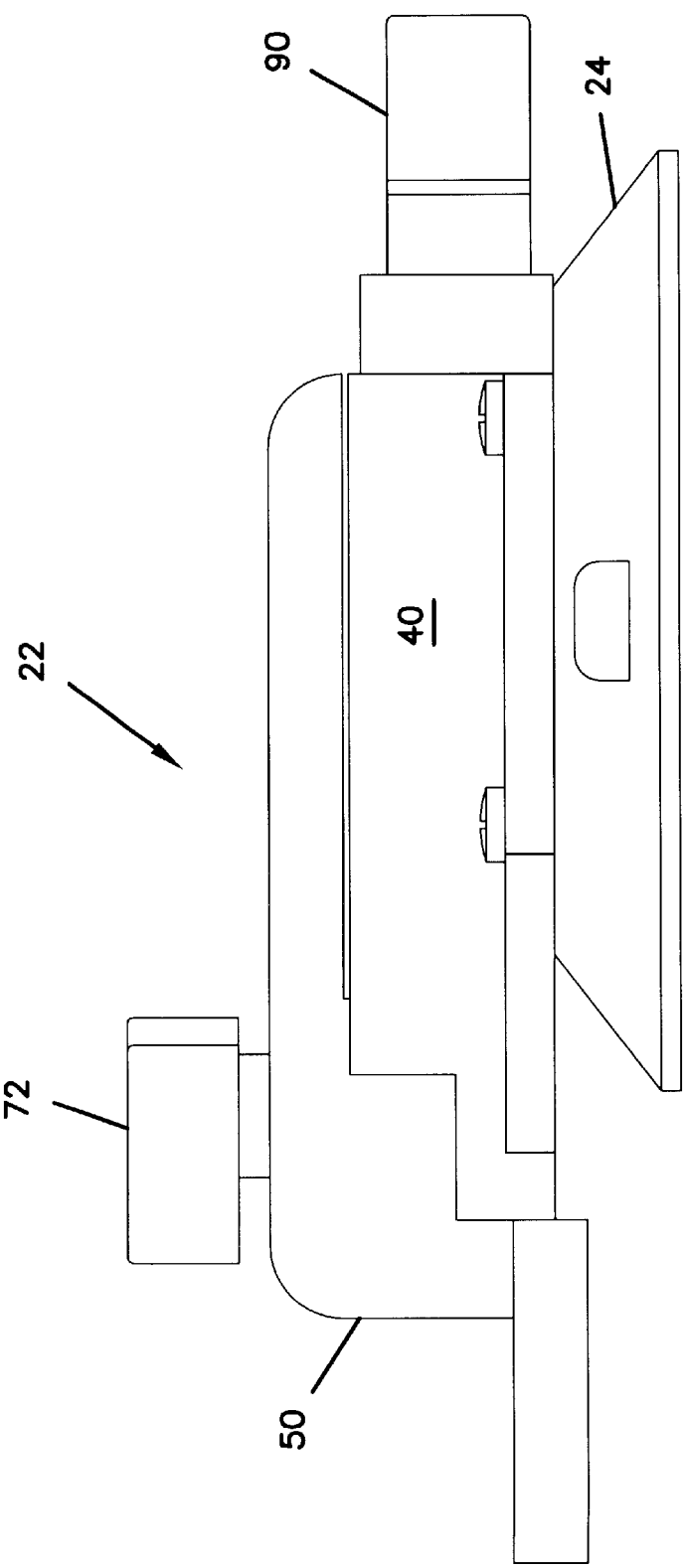
FIG. 4 is a side view of the bridge of FIG. 1, the opposite side being identical thereto.
Figure 5:
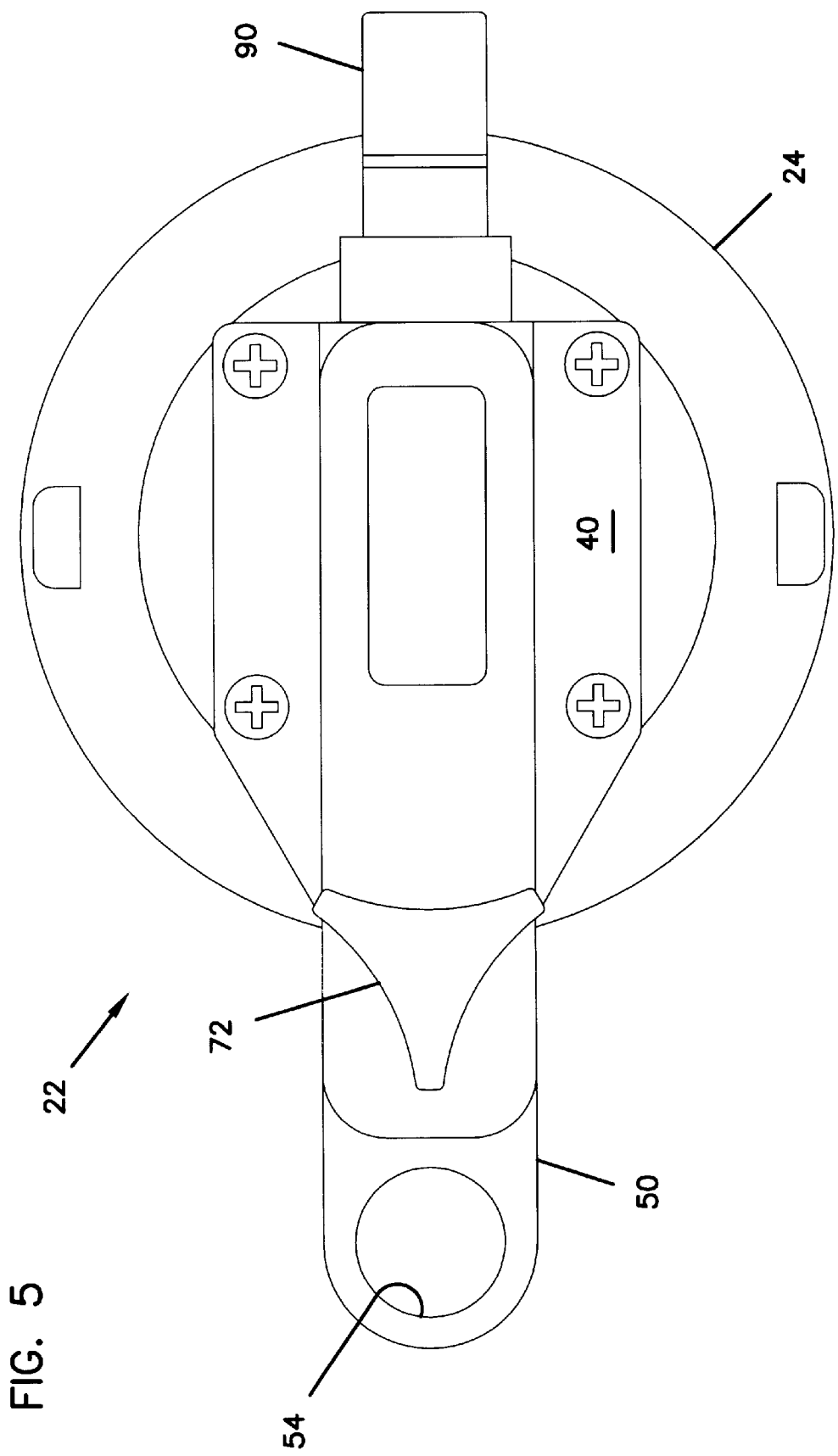
FIG. 5 is a top view of the bridge of FIG. 1.
Figure 6:
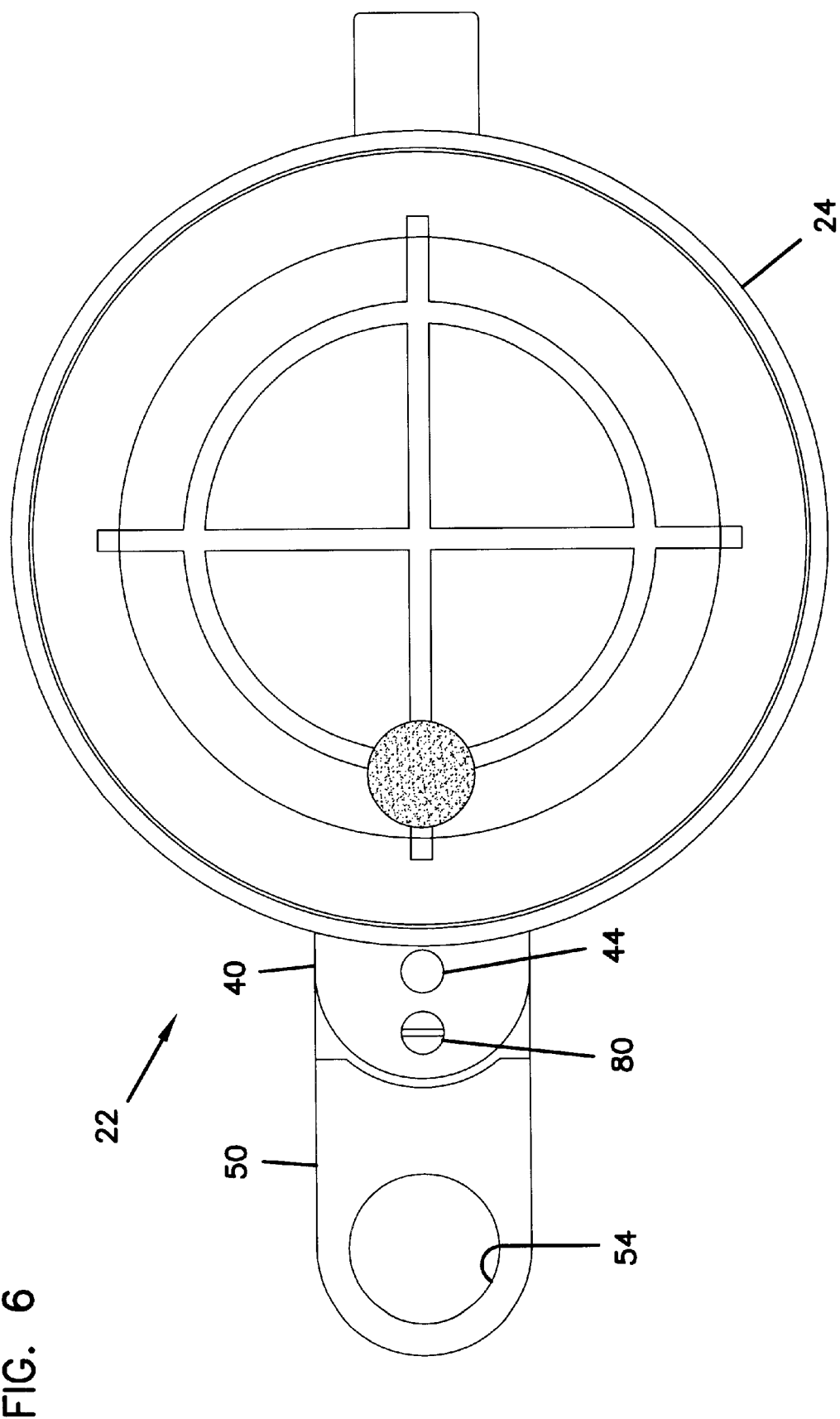
FIG. 6 is a bottom view of the bridge of FIG. 1.
Figure 7:
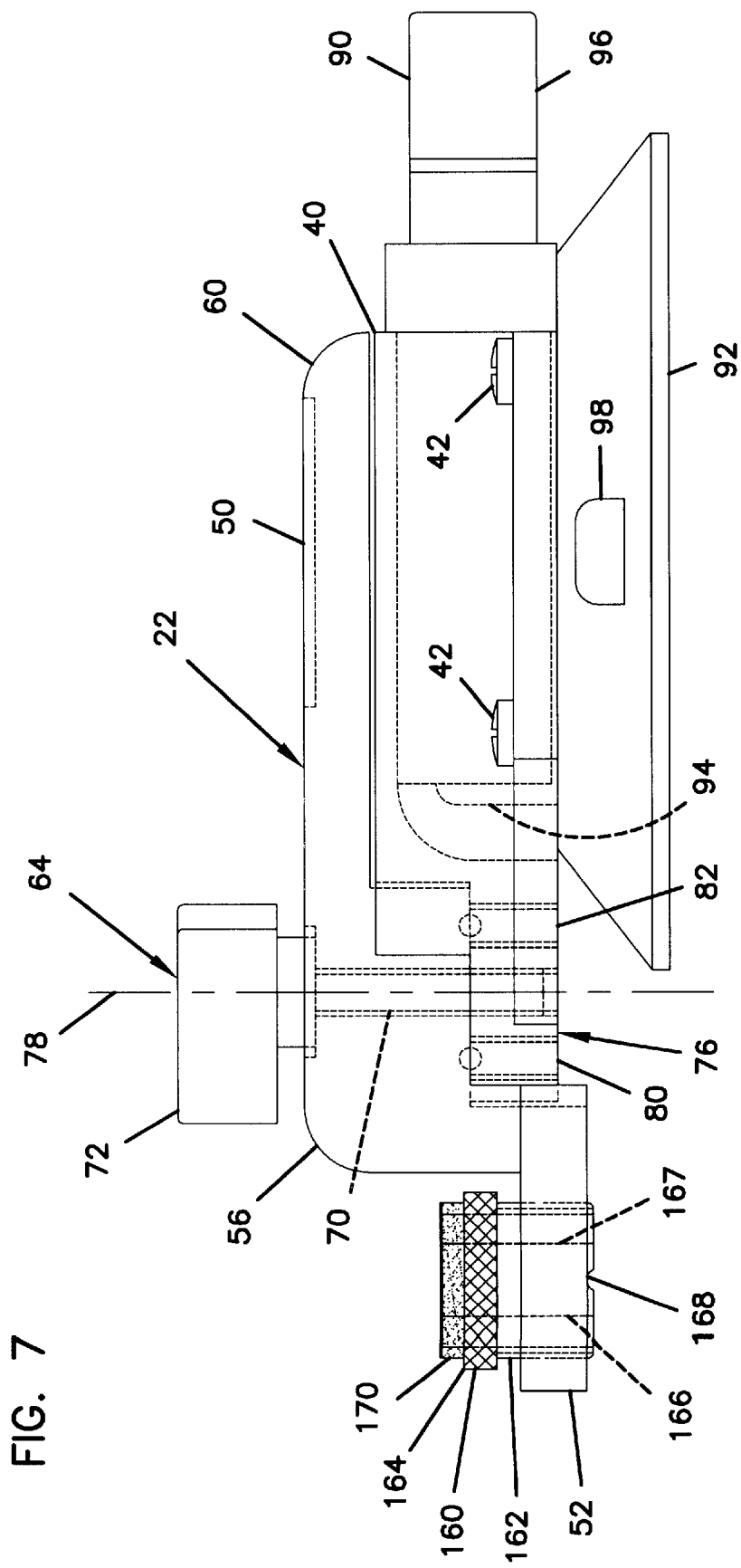
FIG. 7 is a side view of the windshield repair apparatus of FIG. 1, with the injector removed from the injector collar, and showing interior portions of the bridge and the injector collar in dashed lines.
Figure 8:
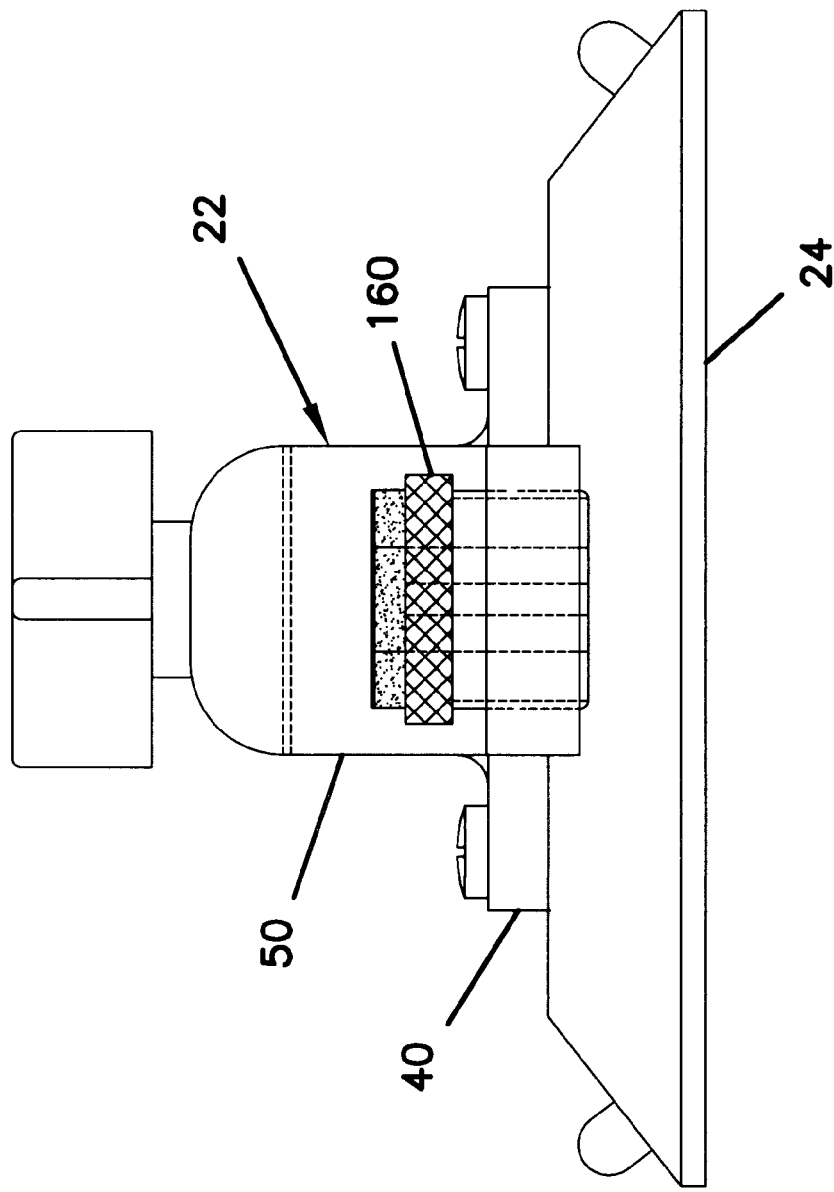
FIG. 8 is a left end view of the windshield repair apparatus of FIG. 7.

Referring now to FIG. 1, a first embodiment of a windshield repair apparatus 20 is shown. Apparatus 20 includes a support apparatus or bridge 22 which mounts to a top surface 28 of windshield 30 with a resilient suction cup 24. Suction cup 24 supports bridge 22 on windshield 30. Bridge 22 holds an injector 26 adjacent to a break area 32 in windshield 30 for the application of ultra-violet light curable plastic resin. In addition, injector 26 can also be used to apply air pressure above and below atmospheric pressure to the break area. Further, injector 26 facilitates use of a tool to mechanically engage the break area to facilitate repair during the application of pressure (+ or −) and/or the repair material.

Referring now to FIGS. 2–12, bridge 22 includes a base 40 which mounts to suction cup 24 via four screws 42. Screws 42 pass through openings 45 in base 40 and threadably engage threaded apertures in an upper surface of suction cup 24.

Figure 9:
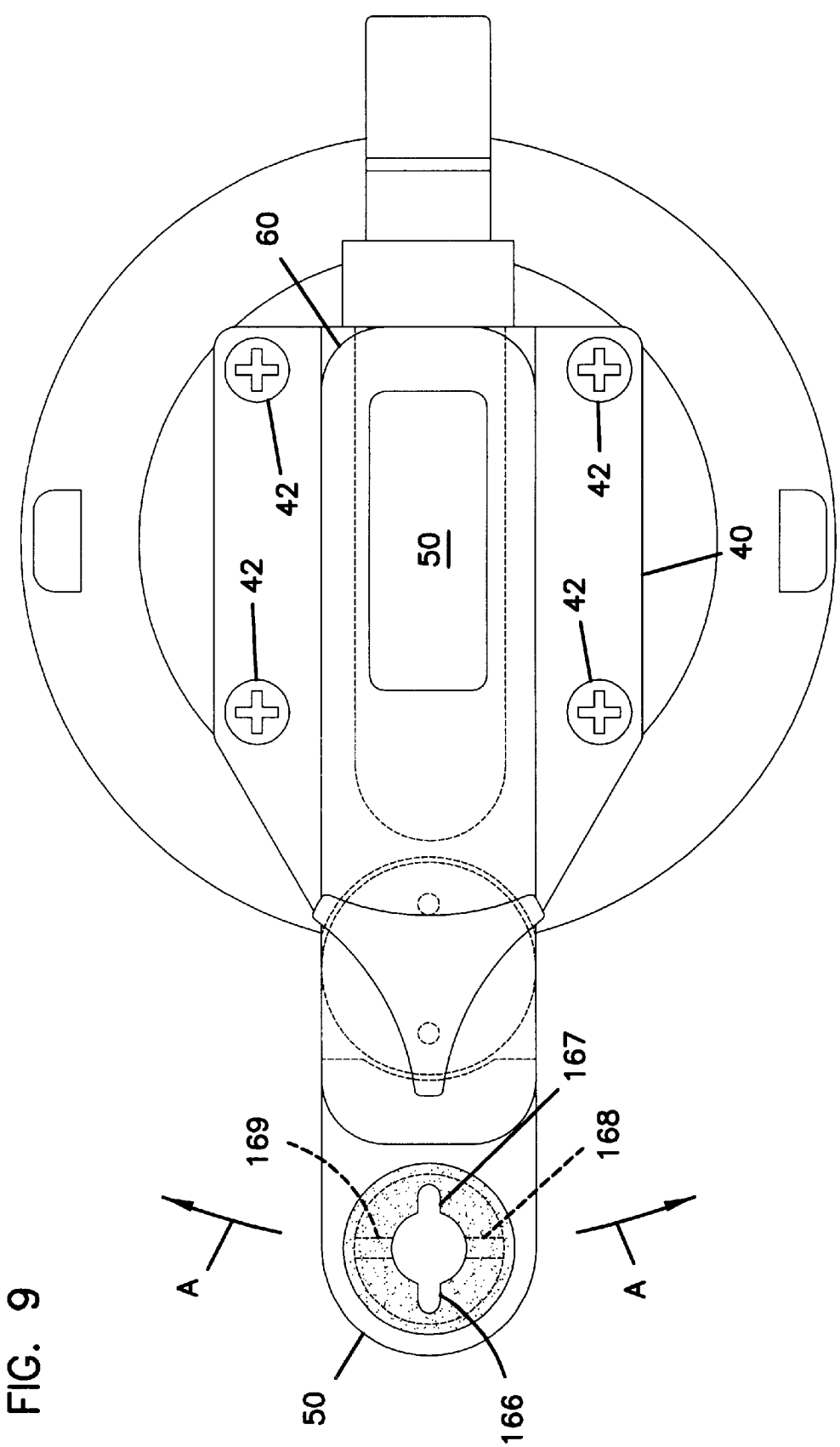
FIG. 9 is a top view of the windshield repair apparatus of FIG. 7.
Figure 11:
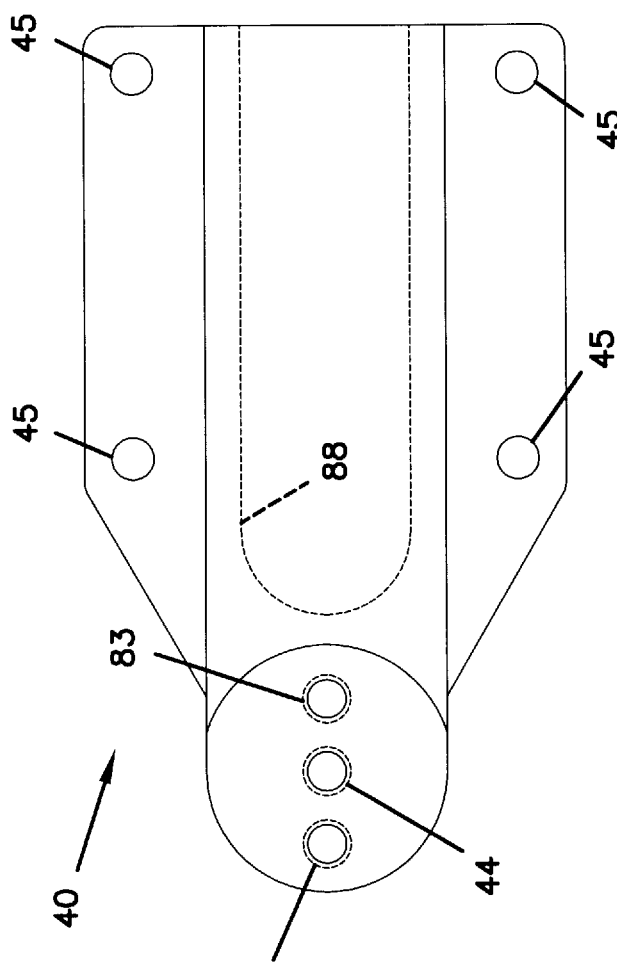
FIG. 11 is a top view of the base of FIG. 10.
Figure 10:
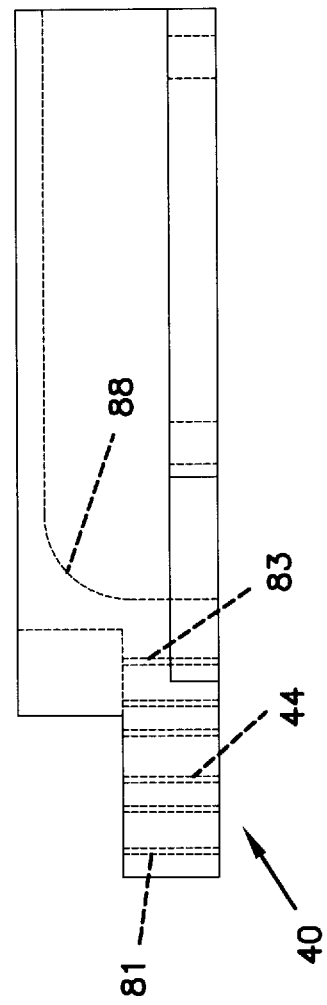
FIG. 10 is a side view of the base of the bridge of FIG. 1.
Figure 12:
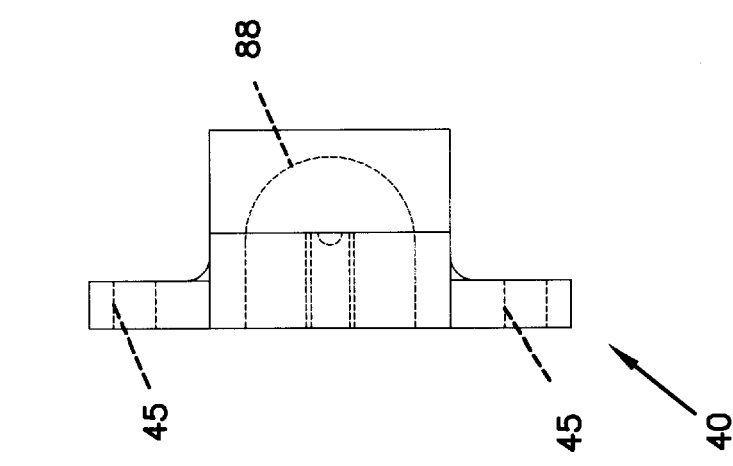
FIG. 12 is a left end view of the base of FIG. 10.
Figure 16:
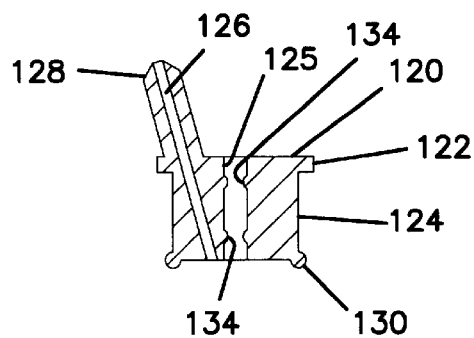
FIG. 16 is a cross-sectional side view of the stopper of the injector.
Figure 17:
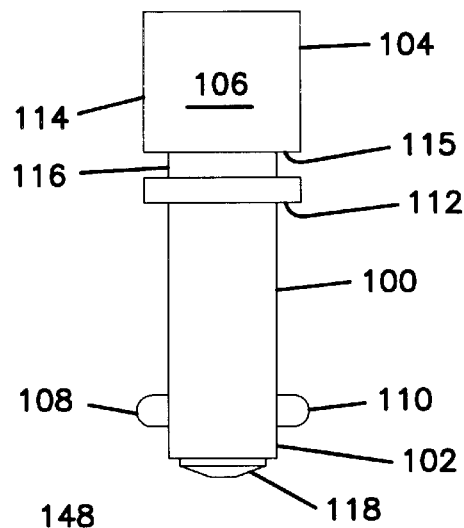
FIG. 17 is a side view of the body of the injector.
Figure 18:
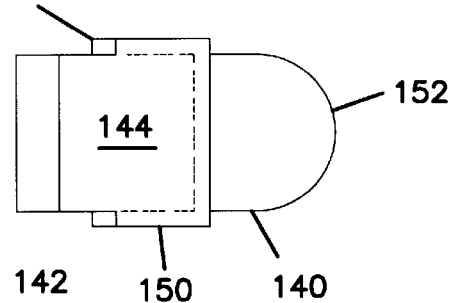
FIG. 18 is a side view of the clip of the injector.
Figure 19:
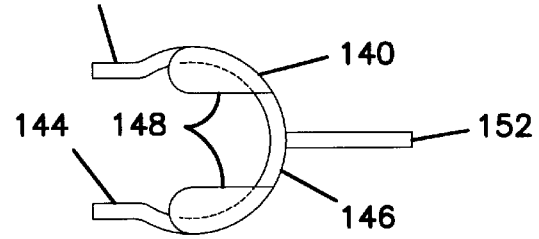
FIG. 19 is a top view of the clip of FIG. 18.
Figure 20:
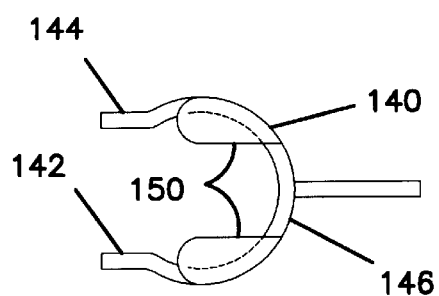
FIG. 20 is a bottom view of the clip of FIG. 18.

Referring now to FIGS. 2–9 and 13–15, pivotally mounted to base 40 is an injector holder or arm 50 having a front end 52 with a threaded opening 54. A central section 56 of arm 50 includes an aperture 58 which receives a shaft 70 of a clamp mechanism 64. Shaft 70 threadably engages a threaded aperture 44 of base 40. By rotating a handle 72 of clamp mechanism 64, arm 50 can be alternatively rotatable relative to base 40 or clamped to base 40 by friction. Projecting in an opposite direction from front end 52 of arm 50 is a handle or lever 60 for use in rotating arm 50. During use, a user moves handle 60 to rotate arm 50 about an axis 78. Axis 78 is generally perpendicular to windshield 30. Arrows A of FIG. 9 illustrate the direction of possible rotation of arm 50.

Bridge 22 includes a registration system 76 so that following relative rotation of arm 50 and base 40, arm 50 can be returned to its original position. One preferred registration system includes at least one ball plunger or spring loaded pin 80 projecting from one of base 40 or arm 50 to engage the opposite member. In the embodiment of bridge 22 illustrated, ball plunger 80 is positioned in a threaded aperture 81 of base 40. Ball plunger 80 has an outer threaded surface, and projects toward a detent 84 in arm 50. Preferably, a second ball plunger 82 and a second detent 86 are provided on opposite sides of shaft 70 of clamp mechanism 64. Second ball plunger 82 is positioned in threaded aperture 83. Each ball plunger 80, 82 includes a spring loaded end, for example rounded, which is biased toward an extended position by an internal spring. During rotation of arm 50 away from the position shown in FIG. 9, the spring loaded end is pushed into a body of the ball plunger, thereby releasing each ball plunger 80, 82 from detents 84, 86.

During use, clamp mechanism 64 is loosened so that the user can overcome any frictional force exerted by clamp mechanism 64 acting to hold arm 50 and base 40 in position. The user rotates handle 60 to rotate arm 50. Upon rotation of arm 50, ball plungers 80, 82 allow for release from detents 84, 86, and allow arm 50 to be rotated relative to base 40. Such rotation allows for access to the break area positioned under injector 26. When arm 50 is rotated back toward its original position, the user will realize when the original position has been obtained due to ball plungers 80, 82 reengaging detents 84, 86. Once arm 50 is returned to its original position, clamp mechanism 64 can be retightened, as desired. Handle 60 is conveniently stowed out of the way in the normal operating position shown in FIGS. 7 and 9, for example. Registration system 76 allows for accurate repositioning of injector 26 following initial placement over break area 32 and subsequent removal.

A preferred suction cup 24 includes a vacuum pump mechanism 90 for withdrawing air from underneath cup portion 92. A chamber 88 of base 40 receives elongated cylinder 94 of vacuum pump mechanism 90. A reciprocally mounted pump button 96 is operated by the user to withdraw air from underneath cup portion 92. Bumps 98 on cup portion 92 can be grasped by the user to release the vacuum when removal of bridge 22 is desired. Alternatively, suction cup 24 can be mounted to bridge 22 for selective movement toward and away from windshield 30 to first engage the windshield, and then to develop a vacuum as a central portion of the suction cup is pulled away from the windshield, such as with a crank mechanism.

Referring now to FIGS. 16–21, features of injector 26 are shown in greater detail. Injector 26 includes a body 100 with a tip 102 and an opposite end 104. An outer surface 106 extends from tip 102 to opposite end 104. Two bayonets 108, 110 project from outer surface 106. Spaced from bayonets 108, 110 is a first shoulder 112 and an enlarged region 114 defining a second shoulder 115 spaced further from bayonets 108, 110. Between first shoulder 112 and enlarged region 114 is a circumferential groove 116.

An inside surface 117 of body 100 defines a passage from tip 102 to end 104. Adjacent tip 102 is positioned a resilient inner sleeve or fitting 118 which protrudes from body 100 to sealably engage windshield 30. Resilient inner sleeve 118 facilitates a sealable engagement around the break area for the application of pressure (+ or −) and the containment of a break repair material 119.

Figure 21:
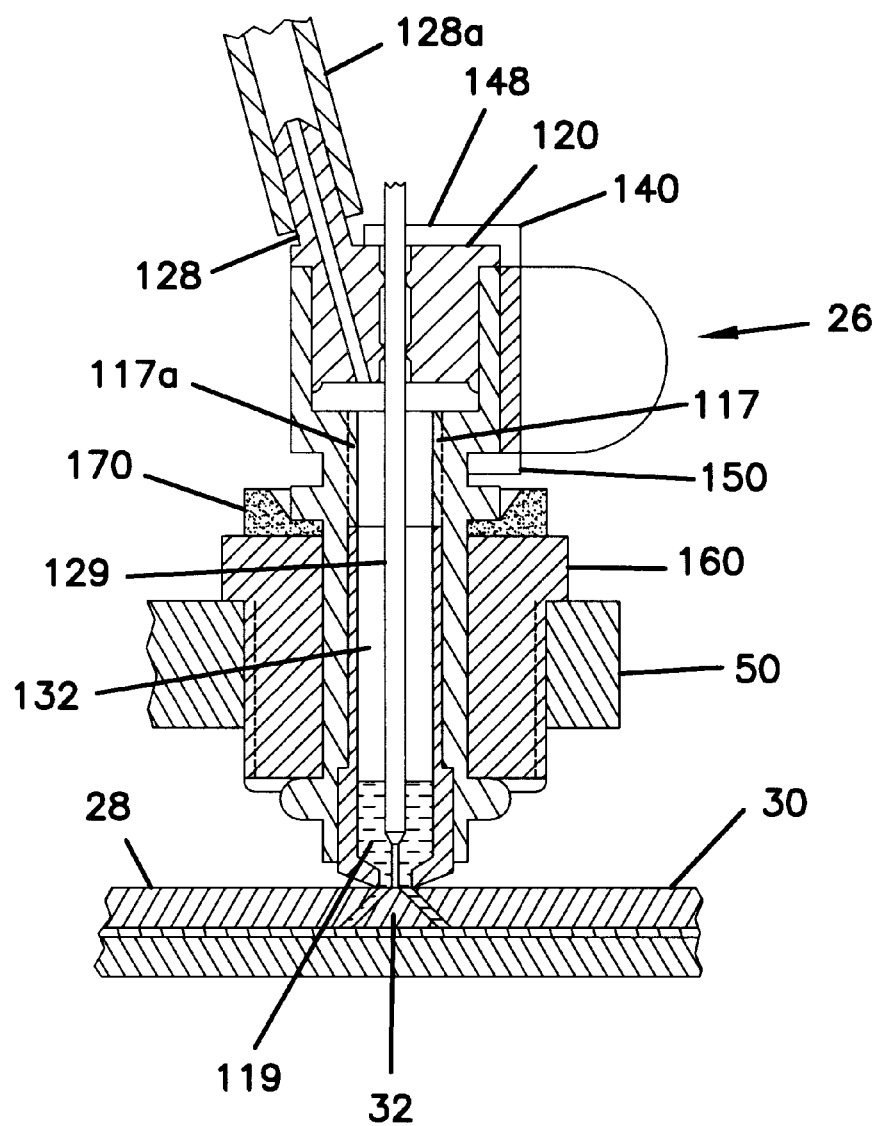
FIG. 21 shows the front end of the windshield repair apparatus of FIG. 1 during use to repair a break area of a windshield.

A resilient stopper 120 closes off the inner passage at opposite end 104 of body 100. Stopper 120 includes an annular flange 122 engageable with opposite end 104 of body 100. Central body portion 124 of stopper 120 resides in the inner passage of body 100. A central passage 125 in stopper 120 is coaxial with an axis of body 100. Offset from the axis is a second passage 126 including a nipple 128 extending from central body portion 124. Preferably, nipple 128 is attachable via a conduit 128a to a source of positive pressure, and a source of negative pressure or vacuum, relative to atmospheric pressure. Central passage 125 allows for receipt of a mechanical probe 129, as shown in FIG. 21. Inner seals 134 of stopper 120 seal against probe 129 during use.

Alternatively, inner threads 117a can be provided on inner surface 117 of body 100 to facilitate use of body 100 with an externally threaded plunger, such as disclosed in U.S. Pat. No. 4,291,866, previously incorporated by reference, instead of stopper 120.

Stopper 120 also includes a peripheral lip seal 130 spaced from flange 122. Lip seal 130 is flexible and protrudes from an end of central body portion 124. In use, lip seal 130 sealably engages an inside surface of body 100. Lip seal 130 seals an inner chamber 132 in injector 26 to allow pressurization of chamber 132.

A clip 140 secures stopper 120 to body 100. Clip 140 includes first and second arms 142, 144 and a resilient central spring portion 146 which biases first and second arms 142, 144 to the position shown in FIGS. 19 and 20. Clip 140 includes two upper inwardly projecting flanges 148, and two lower inwardly projecting flanges 150. Upper flanges 148 and lower flanges 150 are spaced apart to define a chamber to receive enlarged region 114 and a top surface of stopper 120 to secure stopper 120 to body 100 of injector 26. The free ends of arms 142, 144 are movable apart to receive body 100 and stopper 120. Central spring portion 146 returns arms 142, 144 to secure clip 140 to injector 26. Preferably, clip 140 includes a grasping tab 152 for mounting and dismounting clip 140 with body 100 and stopper 120. Clip 140 can be a one-piece integral construction.

An injector collar 160 mounts injector 26 to bridge 22. Injector collar 160 has external threads 162 which threadably engage the threads of threaded opening 54 of arm 50. Knurled region 164 provides a grasping surface for rotation of injector collar 160 relative to arm 50. By rotation of injector collar 160 relative to arm 50, an adjustable height can be achieved for injector 26. Such an arrangement permits vertical height adjustment such that injector 26 is always perpendicular to bridge 22. Some mountings which permit non-perpendicular positioning of the injector may be desirable, such as disclosed in U.S. Pat. No. 4,291,866.

To mount injector 26 to injector collar 160, bayonets 108, 110 are received in slots 166, 167, respectively, of injector collar 160 during insertion of injector 26 into injector collar 160. Following insertion, injector 26 and bayonets 108, 110 are rotated 90° and reside in grooves 168, 169, respectively. A foam ring 170 mounted to injector collar 160 biases bayonets 108, 110 to remain in grooves 168, 169. Preferably, foam ring 170 is a construction which resists set, such as urethane. First shoulder 112 of injector 26 engages foam ring 170, and spaces clip 140 from contact or interference with foam ring 170. Lower flanges 150 of clip 140 reside in groove 116 of injector 26. Preferably, foam ring 170 includes a nylon top sheet to protect the foam from contact with the injector during rotation of the injector to mount the injector to the injector collar. A bottom of foam ring 170 includes pressure sensitive adhesive to securely mount ring 170 to injector collar 160.

FIGS. 22–37 illustrate a second preferred embodiment of a windshield repair apparatus 220 for use in repairing the windshield in a similar manner as apparatus 20 described above. The second embodiment of apparatus 220 differs from the first embodiment in a number of areas. First, the second embodiment positions the registration system in a different location. Second, the clamp mechanism 64 has been eliminated, and a self-locking screw with thrust bearings added to allow rotation of the arm. Third, a front portion of the arm has been supplied with a hinge and an adjustment mechanism for moving the injector toward and away from the windshield as desired. Fourth, the injector mounts directly to the arm instead of through a collar mounted to the arm.

Figure 23:
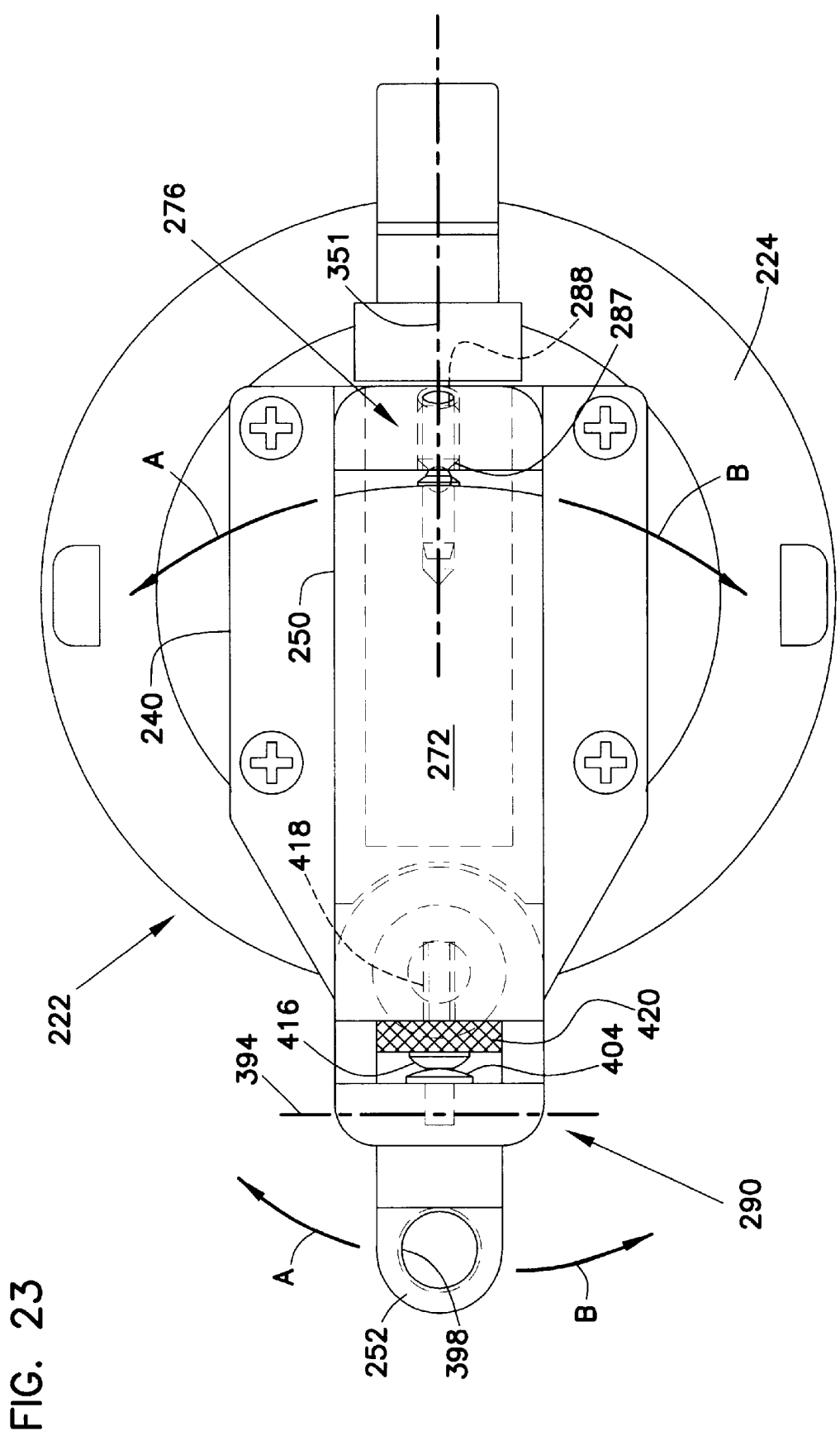
FIG. 23 is a top view of the bridge of FIG. 22 without the injector.
Figure 26:
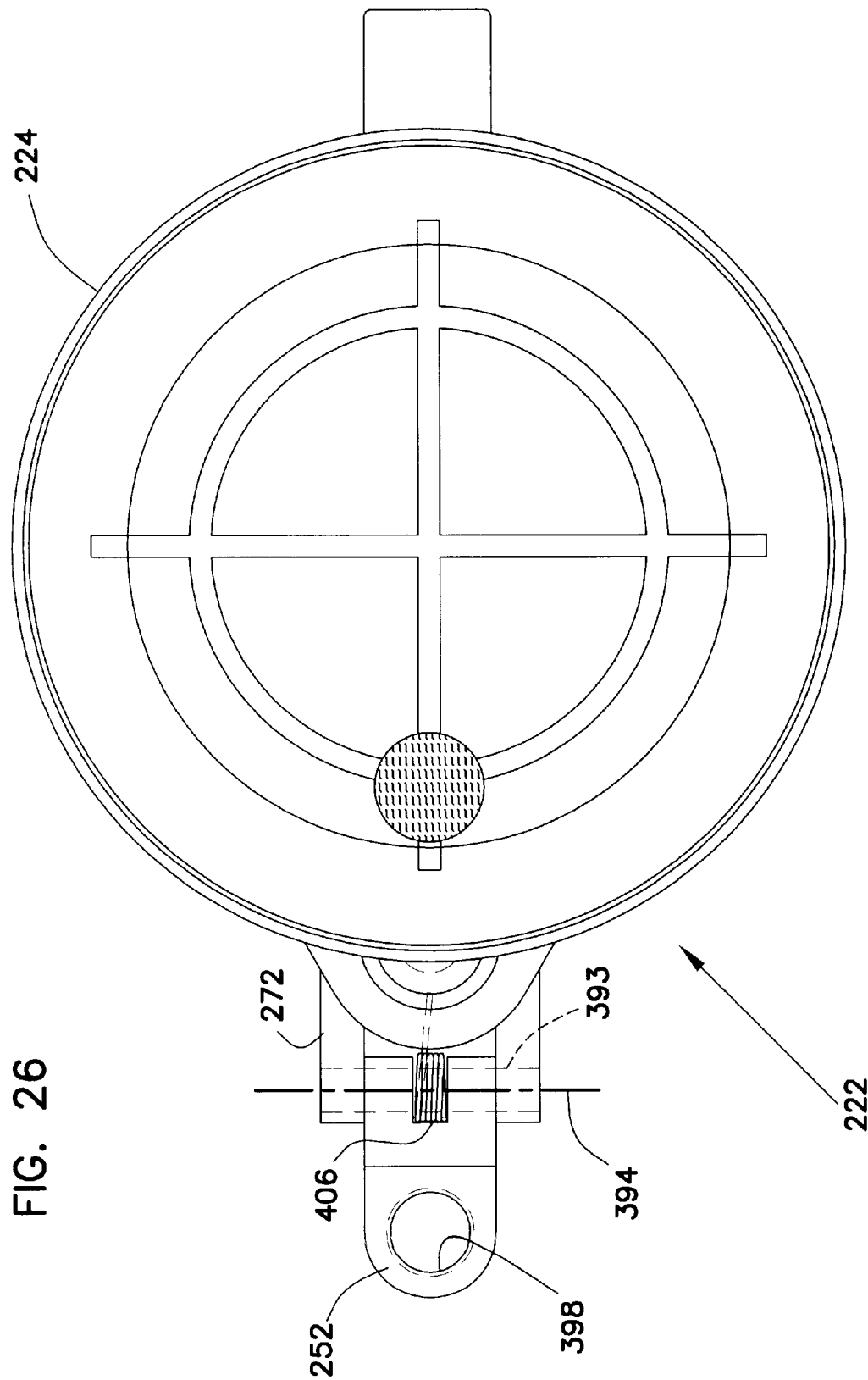
FIG. 26 is a bottom view of the bridge of FIG. 22.

Apparatus 220 includes a support apparatus or bridge 222 which mounts to a windshield 289 with a vacuum suction cup 224 like suction cup 24 described above. As shown windshield 289 is generally planar beneath apparatus 220. An injector 226 like injector 26 described above is positioned at a front end of windshield repair apparatus 220. Injector 226 includes threads 227 for mounting to bridge 220 instead of a bayonet and collar arrangement. To engage windshield 289, injector 226 is rotated relative to bridge 222 so that an inner sleeve 228 sealingly engages windshield 289 in a similar manner as described above. Injector 226 is shown without a stopper. Injector 226 is useable with a stopper as described above. A base 240 of bridge 222 mounts to suction cup 224. An injector holder or arm 250 is pivotally mounted to base 240 at a hinge 246 defining an axis 251. Arm 250 is moveable either in the direction of arrows A or B (FIG. 23).

Figure 22:
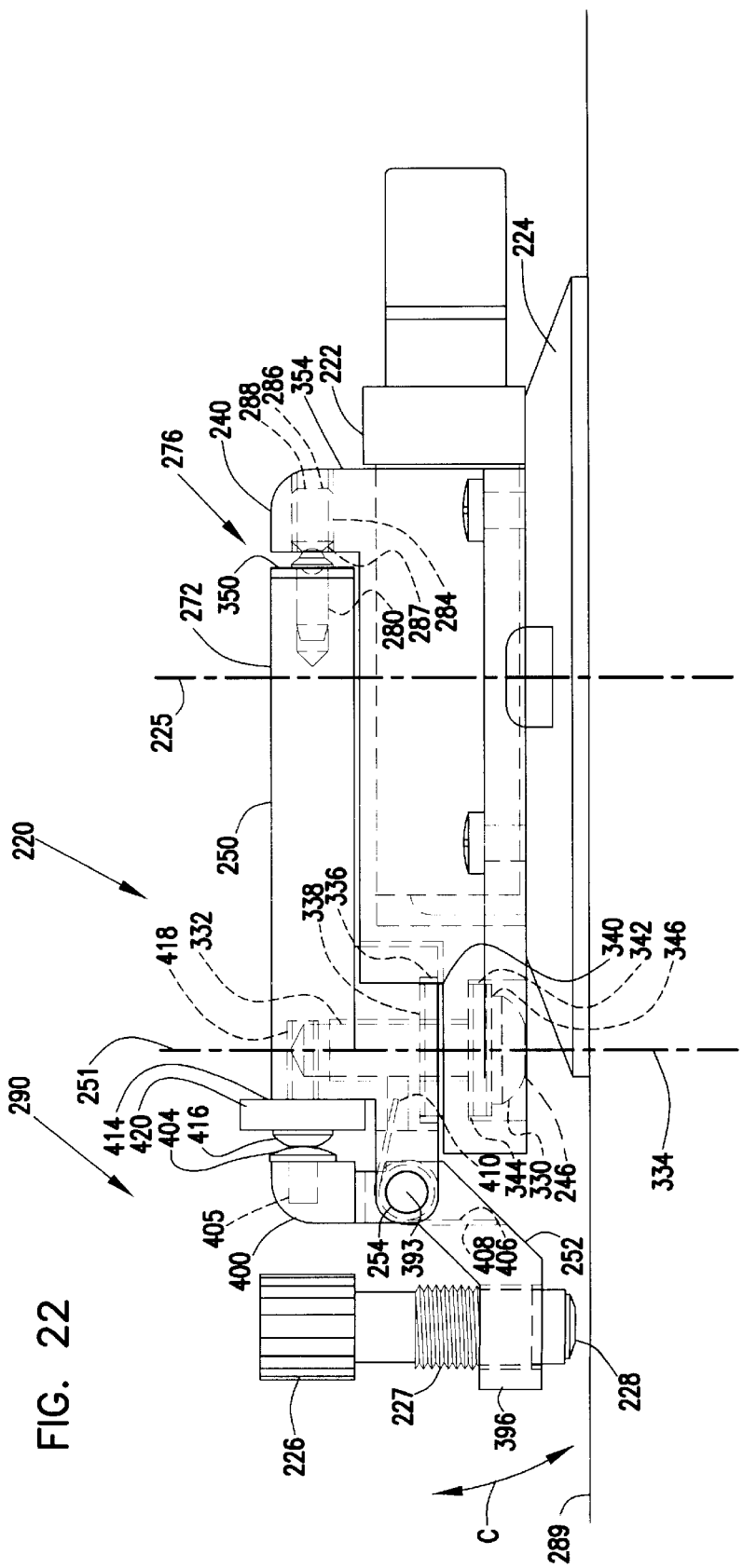
FIG. 22 is a side view of a second embodiment of a windshield repair apparatus in accordance with the invention, the opposite side being generally identical thereto.

Arm 250 includes a front end portion 252 and a handle or lever portion 272. In the preferred embodiment shown, front end portion 252 is joined to handle portion 272 at a hinge 254 for movement in the direction of arrow C (FIG. 22).

A registration system 276 maintains arm 250 in a predetermined position relative to base 240. Registration system 276 is releasable as desired, such as to inspect a break site. Releasing registration system 276 allows for rotation of arm 250 about axis 251 relative to base 240. Axis 251 is generally perpendicular to windshield 290. Axis 251 is generally parallel to a central axis 225 of suction cup 224. After inspecting or otherwise accessing the site, the user repositions arm 250 with registration system 276. Registration system 276 of apparatus 220 includes a ball plunger or spring loaded pin 280 mounted to arm 250, and a detent 284 on base 240. If desired, the relative positions of the pin 280 and the detent 284 could be reversed.

A threaded self-locking screw 330 mounts arm 250 to base 240 to define rotation axis 251. Preferably, screw 330 is a self-locking buttonhead screw including a nylon patch on a shaft 332 which locks the screw in place in a threaded aperture 360 of arm 250. In the second preferred embodiment, an upper bearing 336 surrounded by disc washers 338, 340, and a lower bearing 342 surrounded by disc washers 344,346 allows pivoting of arm 250 relative to base 240 when registration system 276 is released. Bearings 336, 342 are preferably thrust bearings, needle roller and cage assembly type. A head 334 of screw 330 is received in a recess 358 of base 240. Screw 330 also passes through aperture 359 of base 240. Lower bearing 342 and washers 344, 346 also reside in recess 358. Upper bearing 336 and washer 338 reside in a recess 362 of handle portion 272. Screw 330 allows a predetermined load to be placed on each of bearings 336, 342.

Ball plunger 280 of registration system 276 is positioned at a back end 350 of arm 250. Preferably, ball plunger 280 is press fit into an aperture 352 in end 350 of arm 250. Ball plunger 280 moves in a direction of an axis 351 (see FIG. 23) which is transverse to axis 251. Detent 284 preferably includes a threaded pin 286 with a concave end 287 for engaging the ball of the ball plunger, and an opposite end 288 configured for engaging a tool. Threaded pin 286 is positioned in a threaded aperture 356 of a flange 354 of base 240. Threaded aperture 356 allows for adjustable positioning of pin 286 relative to ball plunger 280.

Figure 27:
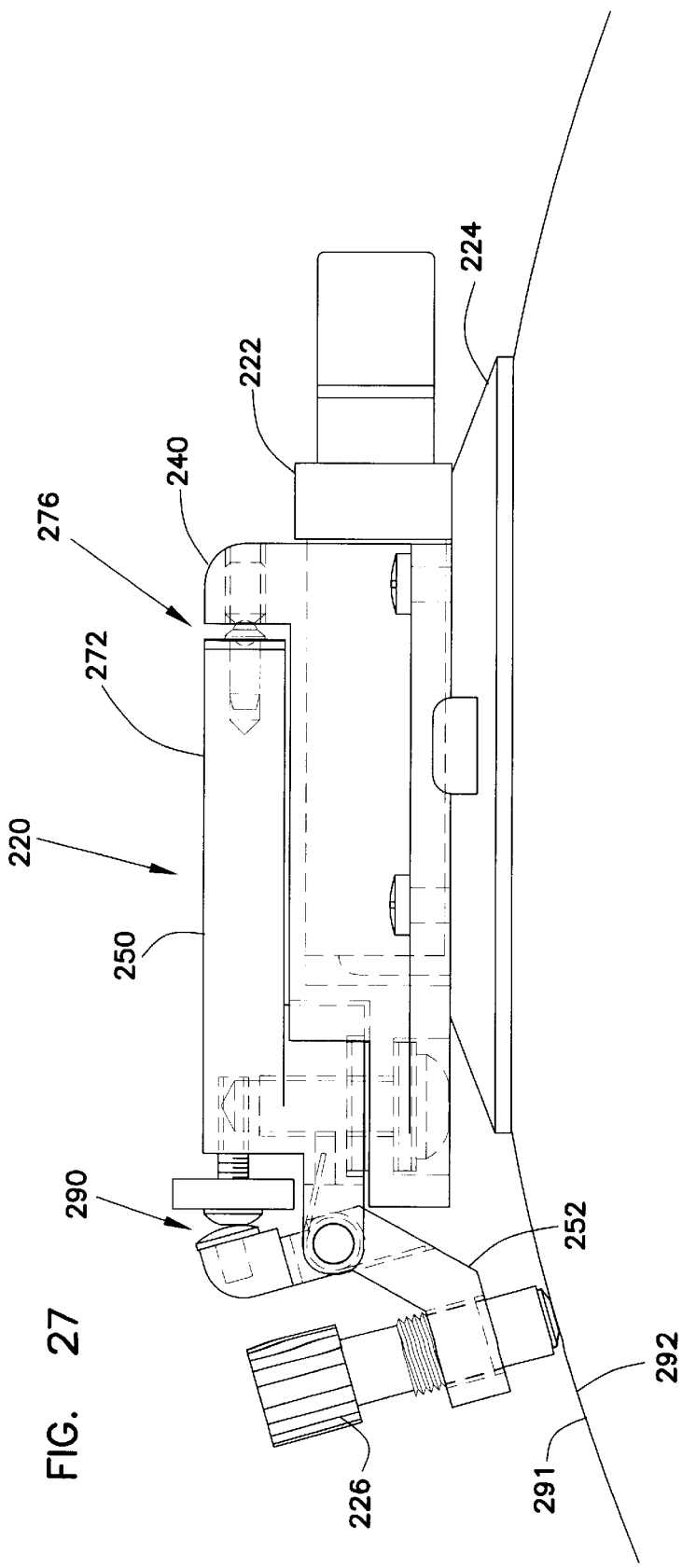
FIG. 27 is a side view of the apparatus shown in FIG. 22, showing the front end rotated toward a windshield having a curved portion under the injector.
Figure 28:
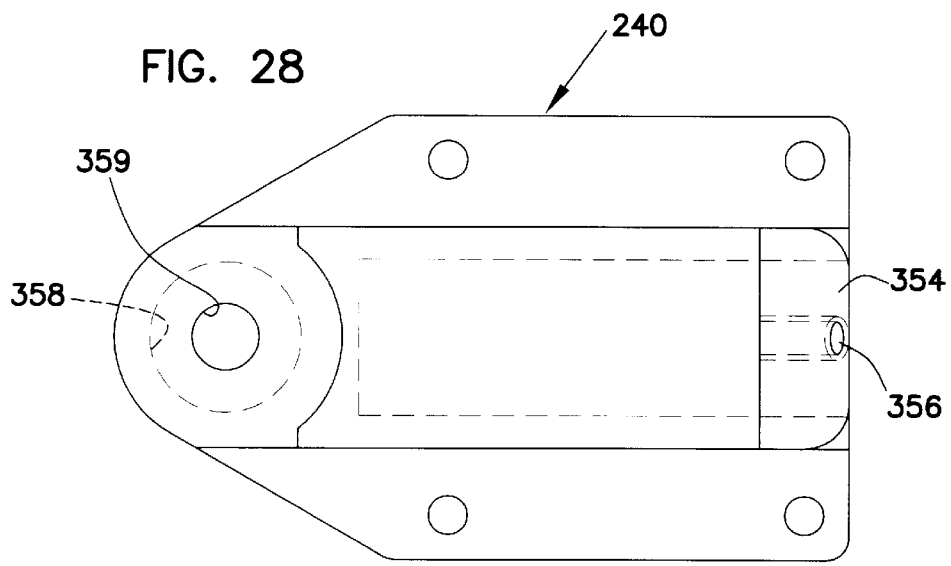
FIGS. 28–30 are top, side, and left end views of the base of the apparatus of FIG. 22.
Figure 29:
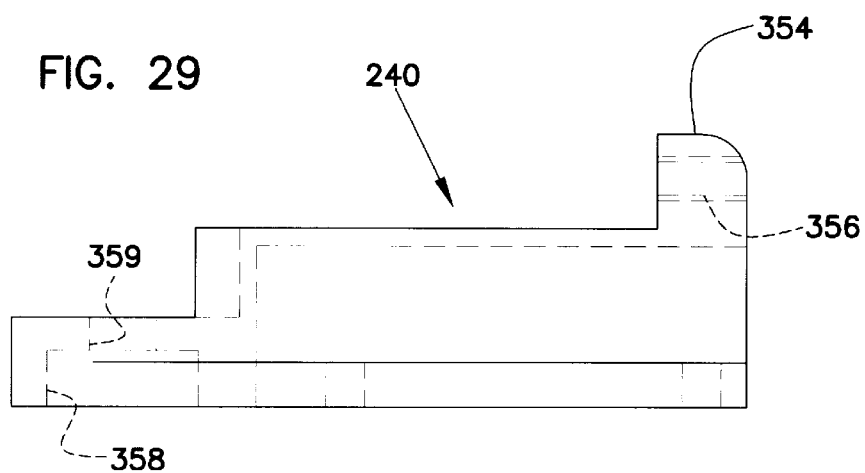
Figure 30:
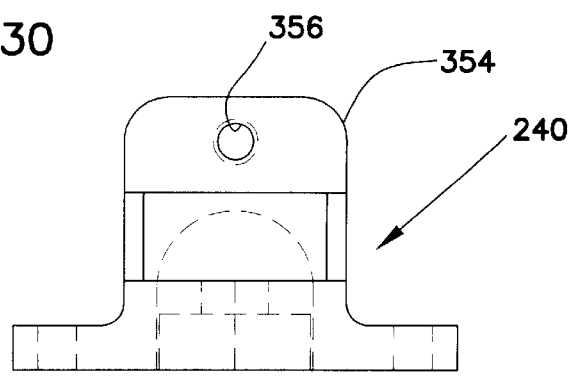
Figure 31:
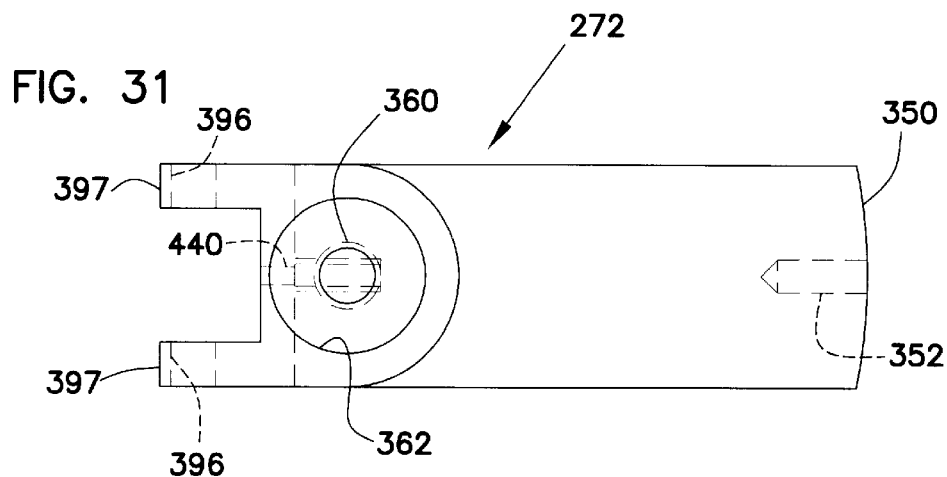
FIGS. 31–33 are bottom, side, and left end views of a handle portion of the arm of the apparatus of FIG. 22.
Figure 32:
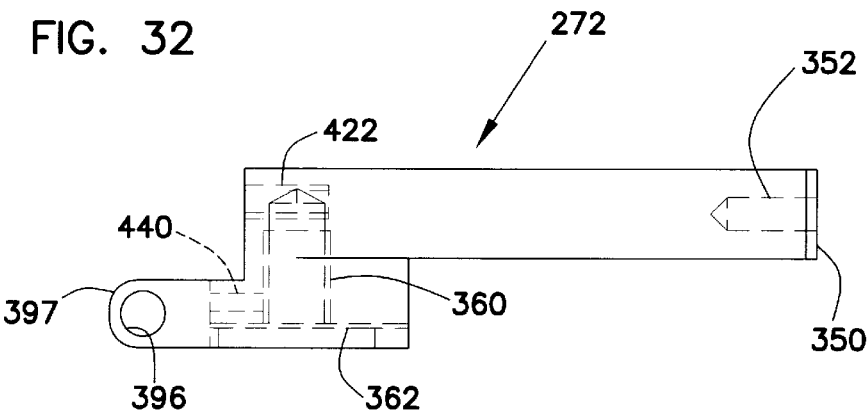
Figure 33:
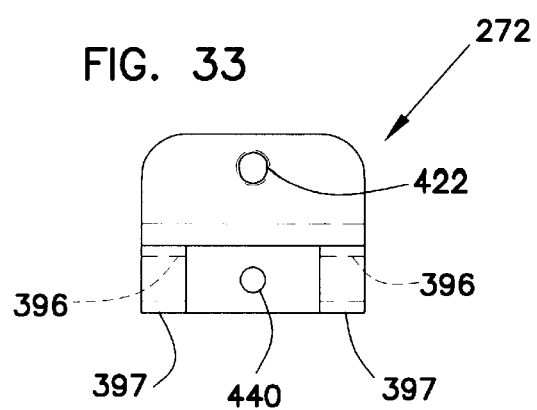
Figure 34:
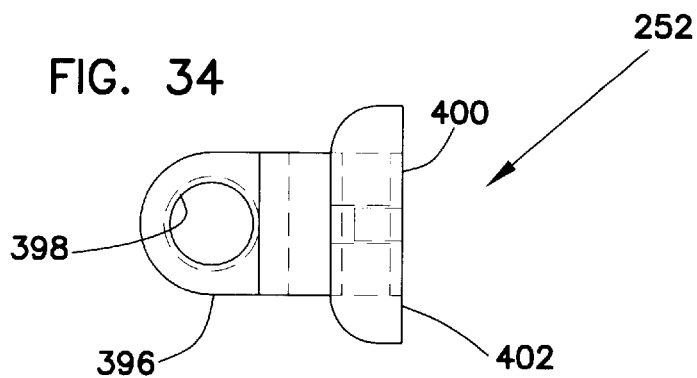
FIGS. 34–36 are top, side, and left end views of a front end portion of the arm of the apparatus of FIG. 22.
Figure 35:
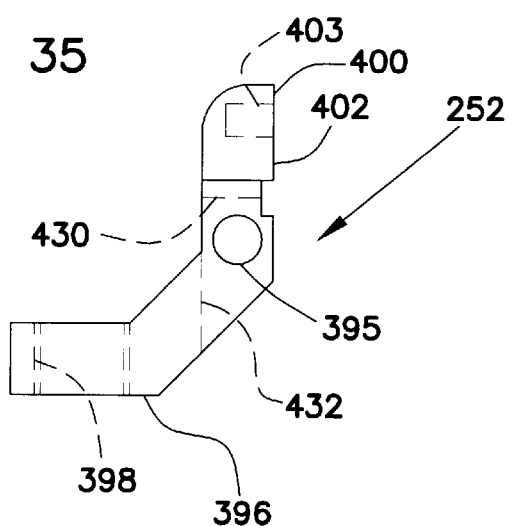
Figure 36:
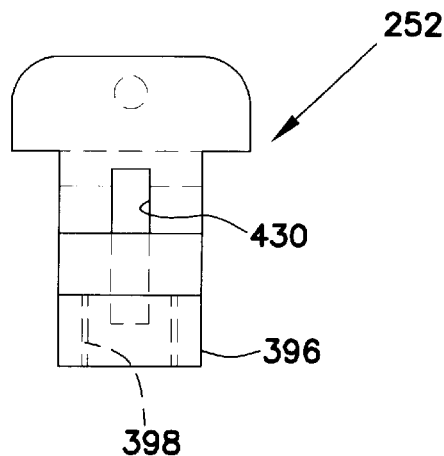
Figure 37:
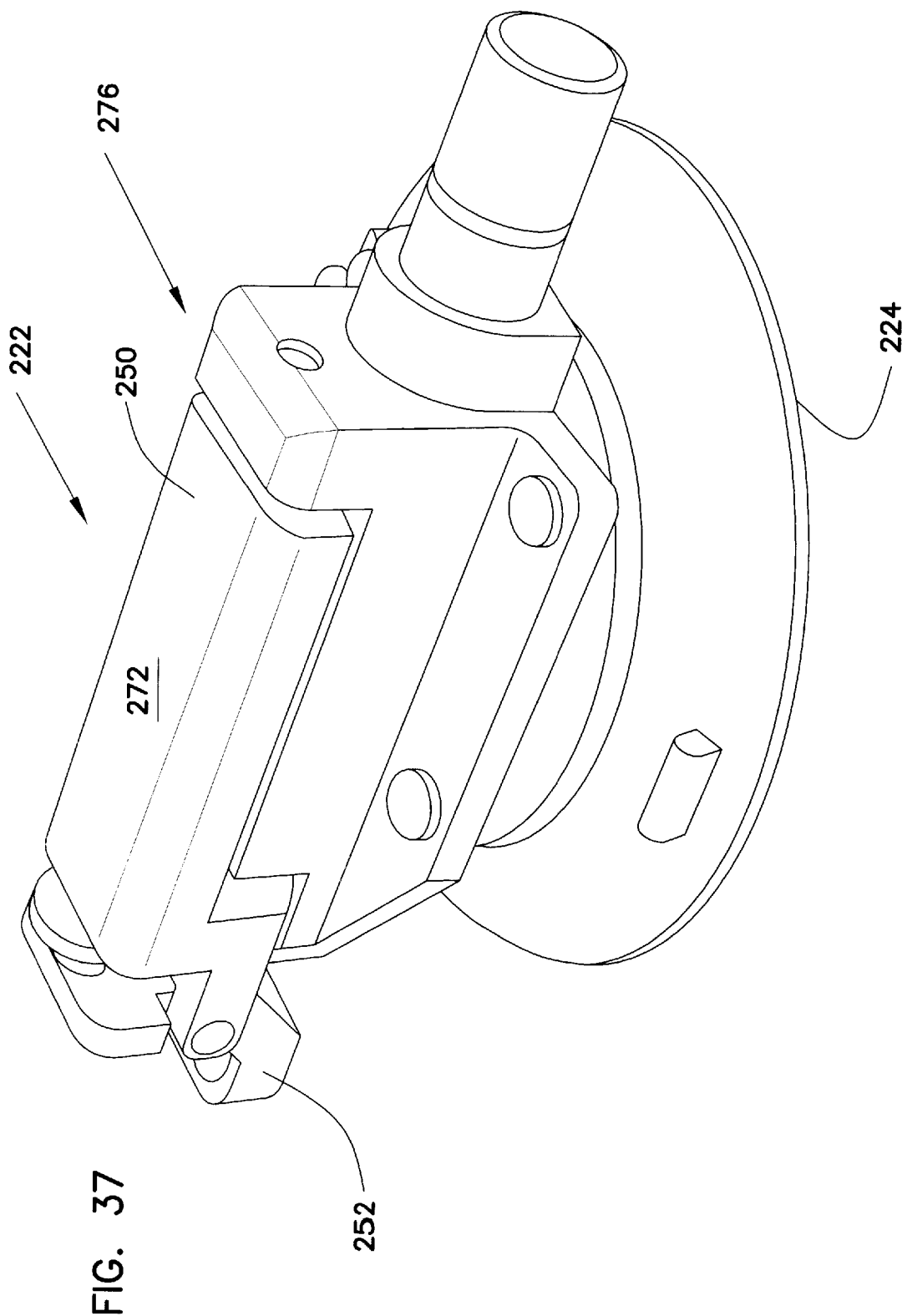
FIG. 37 is a top, side and right end perspective view of the apparatus of FIG. 23.

Preferably, front end portion 252 of windshield repair apparatus 220 is movable toward and away from the windshield in the direction of arrow C (FIG. 22) through the use of a threaded adjustment mechanism 290. FIG. 27 illustrates movable front end portion 252 moved so that injector 226 engages a curved portion 292 of a different windshield 291. Front end portion 252 includes a lower portion 396 and an upper portion 400. Lower portion 396 includes a threaded aperture 398 for receipt of injector 226. Upper portion 400 includes an upper surface 402 including a plastic button 404 with a shaft 405 press-fit into an aperture 403. A torsion coil spring 406 biases upper portion 400 into engagement with an adjustment screw 414 threadably mounted to handle portion 272. A head 416 of screw 414 engages button 404. A shaft 418 includes threads for threaded engagement with a threaded aperture 422 of handle portion 272. A knurled wheel 420 of adjustment screw 414 provides a gripping surface for manual rotation of shaft 418 in the direction of arrow D (FIGS. 24 and 25) and adjustment of the position of front end portion 252 relative to handle portion 272. Instead of a spring biased adjustment screw 414, a turnbuckle (not shown) having two shafts with threads turning in opposite directions is also possible to provide adjustment of front end portion 252 relative to handle portion 272.

Hinge 254 between front end portion 252 and handle portion 272 includes a pin 393 passing through an aperture 395 of front end portion 252, and an aperture 396 through each clevis arm 397 of handle portion 272. Torsion spring 406 resides in a gap 430 through front end portion 252, and the coils of spring 406 are also positioned around pin 393. One end 408 of spring 406 bears against a surface 432 of front end portion 252, and the other end 410 bears against handle portion 272 and resides in opening 440. Torsion spring 406 biases button 404 into engagement with head 416 of screw 414.

It is to be understood, that even though numerous characteristics and advantages of the invention have been set forth in the foregoing description, together with details of the structure and function of the invention, the disclosure is illustrative only, and changes may be made in detail, especially in matters as such shape, size, and arrangement of the parts within the principles of the invention to the full extent indicated by the broad general meaning of the terms which the appended claims are expressed.

What is claimed is:

1. A windshield repair apparatus for use on a windshield comprising:

a bridge having a suction cup extending from the bridge for mounting the bridge to the windshield;

the bridge including a pivotally mounted arm, the arm defining an injector holder, the arm rotatable about a first axis between an original position and a rotated position; and the bridge including a registration system engageable with the pivotally mounted arm for allowing return of the pivotally mounted arm to the original position from the rotated position, wherein the first axis and a central axis of the suction cup are generally parallel, and wherein the pivotally mounted arm includes a back end opposite the injector holder, the registration system positioned at the back end of the arm, the registration system including a ball plunger moveable in a direction transverse to the first axis.

2. The apparatus of claim 1, further comprising a vacuum pump mounted to the suction cup.

3. The apparatus of claim 1, wherein the registration system includes a ball plunger and detent arrangement.

4. The apparatus of claim 1, further comprising an injector mounted to the injector holder.

5. The apparatus of claim 4, wherein the injector includes:

a body extending from a tip to an opposite end, the body having an outside surface, and an inner surface defining an inner passage;

a resilient fitting disposed at the tip partially within the inner passage; and a resilient stopper with at least one passage closing off the opposite end in the inner passage, the resilient stopper including a peripheral lip seal positioned within the body.

6. The apparatus of claim 5, wherein the stopper includes two passages, wherein one passage through the stopper is central to the stopper, and one passage is offset, and wherein the offset passage includes a nipple.

7. The apparatus of claim 1, wherein the pivotally mounted arm has a front end defining the injector holder, the front end rotatable about a second axis relative to a remainder of the arm, the front end rotatable toward and away from the general direction faced by the suction cup.

8. The apparatus of claim 7, further comprising a threaded adjustment mechanism for selectively positioning the front end of the arm relative to the remainder of the arm.

9. The apparatus of claim 8, wherein the threaded adjustment mechanism includes a spring biasing the front end in a direction away from the windshield.

10. The apparatus of claim 1, wherein the bridge includes a releasable clamp for selectively clamping the pivotally mounted arm to a remainder of the bridge.

11. A windshield repair apparatus for use on a windshield comprising:

a bridge having a suction cup extending from the bridge for mounting the bridge to the windshield;

the bridge including an arm pivotally mounted for movement toward and away from the windshield, wherein the pivotally mounted arm has a front end rotatable about a first axis relative to a remainder of the arm in a direction toward and away from the windshield;

the bridge including a threaded adjustment mechanism for moving the front end of the arm toward and away from the windshield.

12. The windshield repair apparatus of claim 11, wherein the threaded adjustment mechanism includes a spring biasing the arm away from the windshield.

13. A windshield repair apparatus for use on a windshield comprising:

a bridge having a suction cup extending from the bridge for mounting the bridge to the windshield;

the bridge including a pivotally mounted arm, the arm defining an injector holder, the arm rotatable about a first axis between an original position and a rotated position; and the bridge including a registration system engageable with the pivotally mounted arm for allowing return of the pivotally mounted arm to the original position from the rotated position, wherein the pivotally mounted arm has a front end defining the injector holder, the front end rotatable about a second axis relative to a remainder of the arm in a direction toward and away from the windshield.

14. The apparatus of claim 13 further comprising a threaded adjustment mechanism for selectively positioning the front end of the arm relative to the remainder of the arm.

15. The apparatus of claim 14, wherein the threaded adjustment mechanism includes a spring biasing the front end in a direction away from the windshield.

* * * * *